United States Patent Office 3,155,638
Patented Nov. 3, 1964

---

3,155,638
PROCESS FOR EPOXIDATION OF ETHYLEN-
ICALLY UNSATURATED COMPOUNDS
Max B. Mueller, Upper Providence, John G. Iacoviello, Broomall, and Rudolph Rosenthal, Havertown, Pa., assignors to Allied Chemical Corporation, New York, N.Y., a corporation of New York
No Drawing. Filed June 22, 1960, Ser. No. 37,852
12 Claims. (Cl. 260—78.4)

This application relates to a process for the epoxidation of ethylenically unsaturated compounds with the production of high yields of oxirane compounds.

Epoxidations of ethylenic compounds with the formation of oxiranes (α-epoxy compounds), hydroxy acyloxy compounds and α-glycols, through the use of organic peracids, have been carried out in the past, and proceed according to well known equations as follows:

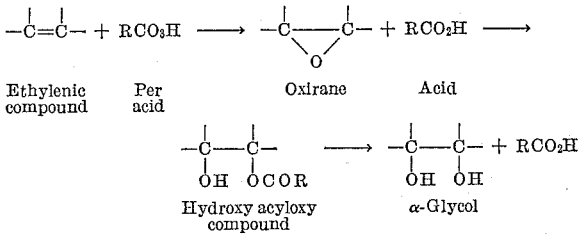

| Ethylenic compound | Per acid | Oxirane | Acid |

Hydroxy acyloxy compound    α-Glycol

In the past, such epoxidations have been carried out principally by reaction of the unsaturated compound with aliphatic monocarboxylic peracids such as peracetic acid.

More recently it has been proposed to carry out the epoxidation reaction simultaneously with the preparation of the peracetic acid reagent, by a method in which the peracetic acid is formed "in situ" in the reaction medium by the addition thereto of acetic acid and an aqueous solution of a peroxygen compound such as hydrogen peroxide in the presence of a strong acid catalyst such as sulfuric acid or a sulfonic acid type ion exchange resin.

This "in situ" epoxidation procedure, while offering certain advantages in operation, particularly when hydroxy compounds are the desired end products, has the objectionable features, when used to produce oxiranes, that the strongly acidic catalyst necessary to promote peracid formation, tends to decompose the epoxidized reaction product, promoting rapid hydroxylation, and that recovery of the residual acetic acid remaining after the epoxidation reaction, is difficult and expensive, due to its high solubility in the aqueous reaction mixture.

An object of the present invention is to provide an "in situ" epoxidation procedure in which no strong acid catalyst is required.

Another object of the invention is to provide an "in situ" epoxidation process which is simple and economical and in which the residual acid remaining after the epoxidation reaction is readily recovered.

A further object of the invention is to provide a process for epoxidizing ethylenically unsaturated compounds wherein cleavage of the resulting oxirane group is minimized.

A further object of the invention is to provide a process for producing oxirane compositions substantially uncontaminated with hydroxy decomposition products.

A still further object of the invention is to provide epoxidized drying oil compositions having low residual unsaturation, as indicated by low iodine numbers, coupled with high oxirane values.

These and other objects are accomplished according to our invention wherein a mixture of an ethylenically unsaturated organic compound, a cyclic anhydride of an aromatic or saturated aliphatic dicarboxylic acid wherein the oxygen containing anhydride ring is a five membered ring containing four carbon atoms and one oxygen atom, and hydrogen peroxide are reacted in the presence or absence of an inert organic liquid at a temperature between about 20° C. and about 100° C. in predetermined proportions to form the desired epoxidized compound. To obtain complete reaction, the cyclic anhydride and hydrogen peroxide should be used in quantities at least about the stoichiometric equivalent of the available double bonds in the compound to be epoxidized. A slight excess of both cyclic anhydride and of hydrogen peroxide is desirable. Lesser degrees of epoxidation may be achieved by regulation of the ratio of anhydride and hydrogen peroxide to the double bonds which it is desired to epoxidize.

Unsaturated organic compounds which lend themselves to epoxidation according to our invention are those containing at least one ethylenic group

wherein the double bond or bonds to be epoxidized are not conjugated with other unsaturation. The preferred compounds are those in which the ethylenic carbons each have at least one hydrogen substituent, and at least one of the ethylenic carbons is substituted by an organic radical, for example, compounds of the formulas

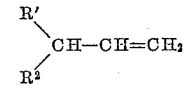

and

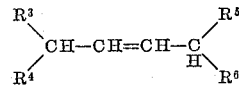

wherein the R's are organic radicals or hydrogen.

Such compounds include the higher unsaturated fatty hydrocarbons, fatty acids and esters, particularly those present in the naturally occurring unsaturated oils such as linseed oil, perilla oil, safflower oil, soybean oil, etc., i.e., mixed glycerides of saturated and unsaturated acids the latter including oleic, linoleic, linolenic, etc.; allyl esters of organic acids such as diallyl phthalate, diallyl maleate, diallyl fumarate, diallyl adipate, etc.; cycloalkenes and their derivatives, such as cyclopentene, dicyclopentadiene, cylohexene, aliphatic esters of Δ⁴ tetrahydro-phthalic acid and the like. Esters of Δ¹ tetrahydrophthalic acid have the ethylenic double bond conjugated with respect to other unsaturation, i.e., the carbonyl group, and hence are inoperative as is also styrene, in which the ethylenic double bond is conjugated with an aromatic ring double bond.

In addition to the chemical compounds and natural oils mentioned above, our epoxidation process can be applied to more complex products having one or more, or a plurality of ethylenic double bonds of the type indicated. Thus, polymeric materials having double bonds can be modified by our epoxidation process, for example, the diallyl phthalate prepolymer known as the beta polymer, may be partially epoxidized leaving a portion of the allyl groups unreacted and available for curing or for cross linking to further modify the properties of the polymeric material as desired. The diallyl phthalate beta polymer is a well known article of commerce and is useful per se as a thermosetting molding composition. It may be prepared as described by W. Simpson in the Journal of the Society of Chemical Industry (London), vol. 65, pages 107–111 (1946), by heating dialyl phthalate in the presence of a peroxide catalyst such as benzoyl peroxide up to about 25% conversion to form the so-called beta polymer. This beta polymer is produced in the first stages of the polymerization reaction, i.e., before the gel point is reached and is a linear or lightly branched unsaturated polymer which appears to consist of the monomer units linked through one of the allyl radicals per unit. The beta polymer, thus produced in the first stages of the polymerization reaction may be recovered from the polymer mass in the pregellation stage by precipitation with methyl alcohol. It is obtained in the form of a solid powder which is fusible (M.P. about 90° C.) and is soluble in monomeric diallyl phthalate, acetone, ethylene dichloride, etc., but not in methyl or ethyl alcohols. It has an iodine number between about 50 and about 80 as compared to an iodine number of 206 in the original diallyl phthalate monomer. While useful as a molding resin, the prepolymer lacks the properties of adhesiveness to substrates such as metals, necessary for use as a coating resin.

Due to its residual ethylenic unsaturation, the diallyl phthalate β-polymer may be epoxidized according to our invention to partially reduce the unsaturation and thus produce curable resins of improved adhesive properties, which are useful as coating resins.

We prefer to carry out the epoxidation of the β-polymer to the extent of between about 20% and about 75% of theoretical maximum conversion, i.e., to at least about 0.6% oxirane content, and may carry it to a value of about 3.6% oxirane content. The resulting epoxidized diallyl phthalate beta polymers preferably have iodine numbers between about 10 and about 65 and are soluble in organic solvents such as the liquid aromatic hydrocarbons, e.g., benzene, toluene, xylene, etc., from which they can be applied as liquid coatings in the usual ways, e.g., spraying, brushing, casting, etc. in conjunction with a curing agent, for example, a peroxide to hasten setting by crosslinking to a tough adhesive coating on the metallic or other substrate.

Cyclic anhydrides of dicarboxylic acids suitable for use in carrying out epoxidation reactions according to our invention include the cyclic anhydrides of aromatic and saturated aliphatic dicarboxylic acids wherein the oxygen-containing ring is a five membered ring containing four carbon atoms and one oxygen atom. Thus the suitable cyclic anhydrides include those having the structural formulas shown below

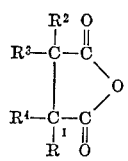

wherein $R^1$, $R^2$, $R^3$ and $R^4$ are members selected from the group consisting of hydrogen, alkyl and aralkyl groups and

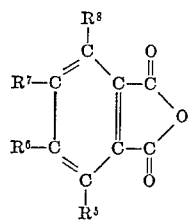

wherein $R^5$, $R^6$, $R^7$ and $R^8$ are members selected from the group consisting of hydrogen and alkyl.

The preferred anhydrides are phthalic anhydride and succinic anhydride.

In carrying out the process according to our invention, the unsaturated compound to be epoxidized is mixed with an amount of cyclic anhydride equal to at least one mole of anhydride for each double bond in the unsaturated compound to be epoxidized, and, if desired, with an inert organic liquid such as benzene, hexane, chloroform, toluene, xylene, cumene and the like, preferably one having a boiling point between about 40° C. and about 250° C. The inert liquid, however, is not necessary, provided the mixture is sufficiently fluid to permit adequate agitation. Alternatively, the desired fluidity may be imparted by the use of an excess of the unsaturated compound. The mixture of unsaturated compound and cyclic anhydride is raised to the desired reaction temperature and a concentrated aqueous solution of hydrogen peroxide preferably of between about 30 and about 70% strength, is added to the mixture, preferably gradually, while agitating the mixture to disperse the peroxide, and while maintaining the temperature of the mixture at the desired reaction level. Addition of hydrogen peroxide is preferably continued until at least the theoretical amount necessary to cause the desired epoxidation, has been added. Then a short digestion period is usually provided while maintaining reaction temperature and agitation until the reaction is substantially complete. During the reaction, the cyclic anhydride is converted to the corresponding dicarboxylic acid which is a solid product, insoluble in water and in the other components of the reaction mixture, and thus readily recoverable for reuse as by filtration, decantation or the like. Thus, when the reaction is complete, the solid dicarboxylic acid is removed as by filtration, and the resulting epoxidized product is recovered by suitable means depending on the end product. For example, epoxidized soyabean oil may be recovered by washing with a mildly alkaline aqueous solution to neutralize any residual dibasic acid which may be present, and then by water, followed by heating under reduced pressure to remove volatile materials such as any inert liquid reaction medium which may have been used.

Completion of the reaction is ascertained by periodic tests to determine the amount of hydrogen peroxide remaining in the mixture. Precautions should be taken to avoid distillation of a mixture containing appreciable quantities of hydrogen peroxide as an explosion may result. Reaction should preferably be continued until the hydrogen peroxide has been reduced to about 10% or less of that originally introduced.

The quantity of hydrogen peroxide and acid anhydride employed will be equivalent to at least one mole for each double bond to be epoxidized. Many unsaturated compounds contain only a single double bond while others contain two, three or more double bonds of the ethylenic type which lend themselves to epoxidation according to our invention. Of the drying oils, soyabean oil usually has about 4.1 moles of unsaturation per mol of oil, since it is a mixture of glycerides of about 11.5% saturated acids and about 83.5% unsaturated acids, the latter usually made up of about 32% of oleic acid (9-octadecenoic acid with one double bond); about 49.3% of linoleic acid (9,12-octadecadienoic acid with two double bonds) and about 2.2% of linolenic acid (9,12,15-octadecatrienoic acid, with three double bonds). Linseed oil contains a larger proportion of linolenic acid glycerides with smaller proportions of oleic, and thus usually has a larger number of moles unsaturation per mole of oil than soyabean oil, usually from about 6.0 moles to about 6.3 moles unsaturation per mole of oil; safflower oil, having a large percentage of linolenic glycerides may have about 4.5 moles unsaturation per mole of oil.

According to our invention, all or any part of the double bonds in the unsaturated compounds treated may be epoxidized by regulating the number of moles of the hydrogen peroxide and acid anhydride used, to a value substantially equivalent to the moles of unsaturation which are to be epoxidized.

Reaction of the phthalic anhydride with the hydrogen peroxide proceeds at a rate significantly more rapid than the concomitant reaction of the anhydride with the water in the aqueous hydrogen peroxide solution so that substantial completion of the hydrogen peroxide reaction occurs before appreciable reaction with water takes place. To compensate for the small quantity of phthalic anhydride converted to phthalic acid by reaction with water and to insure reaction of substantially all the hydrogen peroxide added, it is desirable to use a slight molar excess of phthalic anhydride over hydrogen peroxide, for example between about 5% and about 20% excess depending somewhat on the concentration of the hydrogen peroxide and on the temperature of the reaction. Using 50% aqueous hydrogen peroxide solutions at temperatures in the range between about 50° C. and about 60° C., a mole excess of phthalic anhydride over hydrogen peroxide of between about 8% and about 10% is usually sufficient.

The temperature of the reaction will vary somewhat depending on the unsaturated compound being epoxidized but must be maintained below the decomposition temperature of the reaction product. In general, reaction temperatures are preferably below about 100° C., temperatures between about 20° C. and about 60° C. being suitable for rapid epoxidations of most of the unsaturated compounds indicated.

Higher temperatures promote more rapid epoxidation, but temperatures above about 60° C. tend to increase somewhat the cleavage of the oxirane group formed. Temperatures higher than 60° C. may be used where such cleavage is not objectionable. In any event the cleavage which occurs in the process of the present invention is substantially less than obtained in prior art in situ processes using peracetic acid in the presence of an acid catalyst, at comparable temperatures, cleavage values of between about 10% and about 20% usually being experienced in such prior art process at reaction temperatures of about 60–65° C.

The reaction rates according to our process are surprisingly rapid even at the moderate temperatures indicated and are usually complete in not more than about 10 hours.

The process of the present invention thus avoids the disadvantages of the prior art in situ epoxidation processes in that no acid catalyst is required, that the dicarboxylic acids formed in our epoxidation reaction have little or no tendency to react further with the oxirane ring once it is formed, and the dicarboxylic acids as defined, being solids, can readily be recovered by simple filtration and reconverted to the cyclic anhydride. Furthermore, the elimination of side reactions permits the preparation of epoxidized products with essentially the theoretical amount of oxirane oxygen equivalent to all or part of the double bonds in the starting material with extremely low residual unsaturation and with cleavage of the oxirane ring usually amounting to not more than about 10% at the preferred reaction temperatures.

Degree of cleavage of the oxirane product to the dihydroxy form can readily be calculated in the case of those compounds for which valid iodine numbers are determinable, according to the following equations:

$$\text{Mol percent oxirane} = 15.875 Y \left( \frac{25{,}400 + 34 I_0}{I_0(254 + 0.34I + 2.858Y)} \right)$$

$$\text{Mol percent unreacted} = I \left( \frac{25{,}400 + 34 I_0}{I_0(254 + 0.34I + 2.858Y)} \right)$$

Mol percent cleavage =
100 − (mol percent oxirane + mol percent unreacted)

wherein $I_0$ = iodine number of unreacted soyabean oil
$I$ = iodine number of final product
$Y$ = percent epoxy oxygen of final product Thus the compositions of our invention may have any desired mole percentage oxirane values up to the theoretical maximum for the particular compound. In short, our process enables us to obtain either substantial completeness of the epoxidation reaction if desired or to obtain a desired lesser degree of completeness of epoxidation. It also prevents undue cleavage of the oxirane ring with the formation of hydroxy compounds. Thus high yields of the desired oxirane products substantially uncontaminated with hydroxy cleavage products are insured. The completely epoxidized soyabean oils produced by our process have iodine numbers of not more than about 5, usually between about 1 and about 2, and have oxirane (epoxy) oxygen contents of at least about 88% of the theoretical maximum.

The following specific examples further illustrate our invention.

*Example 1*

To a stirred mixture of 200 parts of soyabean oil (1.06 moles of unsaturation), 200 parts of benzene and 194 parts (1.31 moles) of phthalic anhydride heated to 50° C., was added dropwise, 80 parts (1.18 moles) of a 50 percent aqueous hydrogen peroxide solution over a period of two hours while maintaining the temperature between 55 and 60° C. After addition of all the hydrogen peroxide the reaction mixture was maintained at 60° C. for an additional 2.25 hours when a test indicated only 6.3 percent of the original hydrogen peroxide remained in the mixture, indicating substantially complete epoxidation of the soyabean oil. The mixture was then filtered to separate the solid, insoluble phthalic acid which had precipitated. The filtrate was washed with sodium bicarbonate solution and salt water. The benzene was then removed by volatilization in the presence of active carbon. The resulting epoxidized soyabean oil product had an iodine number of 1.2 and contained 6.3 percent oxirane oxygen.

A run carried out in a manner identical with the above except that only 82 parts, equivalent to 0.555 mole of phthalic anhydride were used, and in which a longer time of reaction was provided after addition of the hydrogen peroxide, had a final iodine number of 67 and an oxirane oxygen content of only 3.1 percent indicating that the reaction had stopped after all the phthalic anhydride provided had been converted to phthalic acid, thus demonstrating that phthalic acid is incapable of sustaining the epoxidation reaction.

*Example 2*

A mixture of 275 parts (0.611 mole) of $\Delta^4$ diisodecyltetrahydrophthalate, having an iodine number of 56, 150 parts of benzene, and 91 parts (.615 mole) of phthalic anhydride was heated with stirring to 50° C. Then 37 parts (0.55 mole) of 50% aqueous hydrogen peroxide was added to the mixture over a one-half hour period keeping the temperature at 55°–60° C. After an additional 45 minutes at this temperature only 6.6% of the hydrogen peroxide originally added remained. The mixture was then filtered to remove the solid phthalic acid which had separated. The filtrate was washed with a 5% sodium bicarbonate solution, then with water, and was stripped of benzene. The resulting epoxidized diisodecyltetrahydrophthalate had an iodine number of 11 and an oxirane oxygen content of 2.87% as compared to 3.4% theoretical maximum, equivalent to 83.5 mol percent oxirane. 16.5 mole percent was unreacted and cleavage was 0 mol percent.

*Example 3*

To a mixture of 200 parts of soyabean oil having an iodine number of 130, 200 parts of benzene and 131 parts (1.31 moles) of succinic anhydride, heated to 40° C. with stirring, was added dropwise over a 1.5 hour period, 80 parts of a 50% aqueous solution of hydrogen peroxide, while maintaining the temperature at 40–45° C. for 3 hours. The temperature was then raised to 50° C. After an additional 3.0 hours at 50° C., 15.8% of the original hydrogen peroxide remained. The mixture was then cooled and filtered to remove solid succinic acid which had separated, and the filtrate washed three times with water, caustic treated and washed with water. The benzene was then removed under vacuum. The resulting epoxidized soyabean oil product had an iodine number of 12.7 analyzed 6.5% oxirane oxygen as compared to the 7.57% theoretical maximum, equivalent to 85.43 mole percent oxirane. Mole percent cleavage amounted to 4.07%, unreacted, 10.5 mole percent.

*Example 4*

To a mixture of 1200 parts soyabean oil having an iodine number of 135, 1200 parts of benzene and 1164 parts of phthalic anhydride, heated to 40° C. were added, with stirring, over a two hour period, 480 parts of a 50% aqueous solution of hydrogen peroxide while maintaining the temperature at 40° C. The reaction was continued for an additional 10 hours at 40° C. when the hydrogen peroxide remaining was found to be less than 10% of that added. The mixture was then cooled to 10–20° C. and filtered to remove solid phthalic acid. The filtrate was washed with water and caustic soda solution, then again with water. Benzene was removed by stripping in the presence of active carbon. The resulting epoxidized soyabean oil product amounted to 1239 parts (103.2 weight percent). It had an iodine number of 1.0, an oxirane oxygen content of 6.9% as compared to the theoretical maximum for this oil of 7.76% indicating a mole percent oxirane of 88.9%, mole cleavage of 10.3%, unreacted 0.8%. The epoxidized soyabean oil product had a color of 2 (Gardner-Holdt scale) when heated at 176° C. for 2 hours.

*Example 5*

An epoxidation was carried out in a manner identical to that described in Example 4 above, except that a soyabean oil having an iodine number of 131 was used, 442 parts of the 50% hydrogen peroxide was added, and the reaction was stopped when only 2.5% of the hydrogen peroxide initially added remained. The resulting epoxidized soyabean oil produce had an iodine number of 3.5, oxirane oxygen of 6.9%, as compared to a theoretical 7.6%, mole percent oxirane of 90.8% unreacted 2.9% and mole percent cleavage of 6.3%.

*Example 6*

To a mixture of 200 parts soyabean oil (iodine number 132), 200 parts benzene and 194 parts phthalic anhydride, stirred at 25° C. was added over a two hour period, 80 parts of a 50% aqueous solution of hydrogen peroxide, keeping the temperature at 25° C. by cooling. The reaction was continued for a period of 72 hours at 25° C. at which time 2.3% of the hydrogen peroxide remained. After removal of solid phthalic acid by filtration, the filtrate was washed with sodium bicarbonate solution and water, and stripped in the presence of active carbon to 100° C. at 10–15 mm. Hg. The resulting epoxidized soyabean oil product was filtered and analyzed. It had an iodine number of 1 and contained 7.1% oxirane oxygen as compared to a theoretical maximum oxirane content of 7.7%, indicating a mole percent oxirane of 92.8%. Cleavage amounted to 6.31%, unreacted 0.82%.

*Example 7*

To a stirred mixture of 200 parts soyabeam oil, 200 parts benzene and 194 parts phthalic anhydride at 25° C. was added 80 parts of a 50% aqueous solution of hydrogen peroxide over a period of one hour and 5 minutes allowing the temperature to rise without external heating to the reflux point of 76° C. The mixture was maintained at this temperature for an additional 35 minutes when 8.25% of the hydrogen peroxide remained. The reaction mass was then filtered to remove solid phthalic acid which had formed. The filtrate was washed with sodium bicarbonate solution and water then stripped in the presence of carbon, giving, after filtration, an epoxidized soyabean oil having an iodine number of 1.2 and having an oxirane oxygen content of 6.3% equivalent to a mole percent oxirane of 83.11%. Unreacted was 1.00 mole percent, cleavage amounted to 15.89%.

*Example 8*

To 200 parts soyabean oil (iodine number 132), 200 parts n-hexane and 194 parts phthalic anhydride stirred at 25° C. was added 80 parts of a 50% aqueous hydrogen peroxide solution over a period of 1.5 hours while allowing the temperature to rise without external heating to the reflux temperature of 62° C. The mixture was maintained at reflux temperature for an additional hour when 9.4% of the hydrogen peroxide remained. The solid phthalic acid which had formed was removed by filtration, and the filtrate washed and stripped in the manner described in Example 7 above. The resulting epoxidized soyabean oil had an iodine number of 6.4 and an oxirane oxygen content of 6.3% equivalent to 82.6 mole percent oxirane. Unreacted amounted to 5.28 mole percent, cleavage to 12.12 mole percent.

*Example 9*

To a reactor equipped with a stirrer, condenser, thermometer, dropping funnel and heating mantle was added 132 parts dicyclopentadiene (1 mole, 2 moles unsaturation), 370 parts phthalic anhydride (2.5 moles), and 700 parts benzene. The mixture was stirred and heated to 55° C., then 144 parts of a 50% aqueous solution of hydrogen peroxide was added dropwise over a 1⅓ hour period maintaining the temperature between 50° C. and and 60° C. by intermittent cooling. The mixture was maintained at 55°–60° C. for an additional 4½ hours when the reaction mixture was cooled to 10°–15° C. and the solid phthalic acid which had separated was filtered off. The filter cake was washed with 800 parts benzene. The filtrate was washed with water, with dilute sodium hydroxide and again with water. The benzene was then stripped off under reduced pressure and 129 parts of solid product was obtained. This product was recrystallized from a hydrocarbon solvent (Skellysolve) and yielded 80 parts of dicyclopentadiene dioxide melting at 180–191° C. The melting point reported in the literature is 180–184° C.

*Example 10*

To a reactor similar to that used in Example 9 was added 394 parts of Δ⁴ diisooctyltetrahydrophthalate (1 mole unsaturation), 197 parts phthalic anhydride and 400 parts benzene. The mixture was stirred and heated to 40° C., then 75 parts of a 50% aqueous solution of hydrogen peroxide was added to the mixture dropwise over a period of 2 hours while maintaining the temperature at 40° C. The mixture was maintained at reaction temperature for 7 adiditional hours after which it was cooled to 10°–15° C. and the solid phthalic acid which had separated was filtered off. The filter cake was washed with two portions of water and then with a 5% solution of sodium hydroxide followed by 2 additional water washes, then distilled in the presence of active carbon to remove benzene. After removal of active carbon, 390 parts of epoxidized diisooctyltetrahydrophthalate were recovered which had an iodine number of 6.0 and contained 3.5% epoxy oxygen, as compared to the theoretical maximum of 3.9%, equivalent to 89.95 mole percent oxirane and unreacted amounted to 9.71 mole percent, cleavage to 0.34 mole percent.

*Example 11*

To a reactor similar to that employed in Example 9 was added 1,230 parts of diallyl phthalate (5 moles containing 10 moles unsaturation), 1,036 parts of phthalic anhydride (7 moles) and 1,600 parts of benzene. The mixture was stirred and heated to 55° C., then 375 parts of a 50% aqueous solution of hydrogen peroxide (5.5 moles) was added dropwise over a 1½ hour period while maintaining the temperature between 55° and 60° C. The mixture was allowed to react for an additional 4½ hours, after which the mixture was cooled to 10°–15° C. and the phthalic acid which had formed was filtered off.

The filter cake was washed with benzene. The filtrate was washed twice with water, then with a 5% solution of sodium hydroxide followed by 2 additional water washes. Then the ester was stripped at 150° C. and 1–2 mm. Hg for 1 hour to remove benzene. The product was then cooled and amounted to 1,149 parts of epoxidized diallyl phthalate having an iodine number of 106 and an epoxy oxygen content of 5.2%. The theoretical value for allyl glycidyl phthalate is 6.1% epoxy oxygen.

*Example 12*

Into a reactor similar to that employed in Example 9 was placed 196 parts of diallyl maleate (1 mole having 3 moles unsaturation), 200 parts phthalic anhydride (1.35 moles) and 400 parts benzene. The mixture was stirred and heated to 55° C., then 75 parts of a 50% aqueous solution of hydrogen peroxide (1.1 moles) was added to the mixture dropwise over a period of 1½ hours while maintaining the temperature between 55° and 60° C. After an additional 4½ hours at 55°–60° C. the reaction mixture was cooled to 10°–15° C. and the solid phthalic acid was filtered off. The filter cake was washed with benzene. The filtrate was washed twice with water, then with a 1% sodium hydroxide solution followed by 2 additional water washes. The product was then distilled to remove benzene and 50 parts of allyl glycidyl maleate was recovered which analyzed 7.7% epoxy oxygen. The theoretical percent epoxy oxygen value for allyl glycidyl maleate is 7.55%.

*Example 13*

To a reactor similar to that employed in Example 9 was added 196 parts of diallyl fumarate (1 mole having 3 moles unsaturation), 200 parts phthalic anhydride (1.35 moles) and 400 parts benzene. The mixture was stirred and heated to 58° C., then 75 parts of a 50% aqueous solution of hydrogen peroxide (1.1 moles) was added dropwise over a period of 1½ hours while maintaining the temperature between 55° and 60° C. After an additional 4½ hours at 55°–60° the raction mixture was cooled to 10°–15° C. and the solid phthalic acid filtered off. The filter cake was washed with benzene. The filtrate was washed twice with water, then with a 1% solution of sodium hydroxide followed by two additional water washes. The product was then distilled and 72 part of allyl glycidyl fumarate was recovered which analyzed 7.5% epoxy oxygen. The theoretical percent epoxy oxygen value for allyl glycidyl fumarate is 7.55%.

*Example 14*

To a reactor similar to that described in Example 9 was added 226 parts of diallyl adipate (1 mole having 2 moles unsaturation), 200 parts phthalic anhydride (1.35 moles) and 600 parts of benzene. The mixture was stirred and heated to 58° C., then 75 parts of a 50% aqueous solution of hydrogen peroxide (1.1 moles) was added dropwise to the mixture over a period of 1½ hours while maintaining the temperature between 55° and 60° C. After an additional 4½ hours at the reaction temperature the mixture was cooled to 10°–15° C. and phthalic acid was filtered off. The filter cake was washed with benzene. The filtrate was washed twice with water, then with a 1% solution of sodium hydroxide followed by 2 additional water washes. The product was then distilled and 66 parts of allyl glycidyl adipate was recovered which analyzed 6.85% epoxy oxygen. The theoretical value for allyl glycidyl adipate is 7.9% epoxy oxygen.

*Example 15*

To a stirred mixture of 193 parts of soyabean oil having an iodine number of 130, 193 parts of benzene and 200 parts of 1,2-cyclohexane-dicarboxylic acid anhydride, heated to 40° C., was added dropwise over a 1.5 hours period, 72 parts of a 50% aqueous solution of hydrogen peroxide, while maintaining the temperature at 40° C. After an additional 4.5 hours at 40° C., 16.7% of the original hydrogen peroxide remained. The mixture was filtered, and the filtrate treated with caustic and washed with water. The benzene was removed under reduced pressure. The resulting epoxidized soyabean oil product had an iodine number of 27 and an oxirane oxygen content of 5.8%.

*Example 16*

To a stirred mixture of 50 parts of soyabean oil having an iodine number of 130, 50 parts of benzene and 72 parts of α,α-dimethylbenzyl succinic anhydride, heated to 40° C., was added dropwise over a 0.5 hour period, 19 parts of a 50% aqueous solution of hydrogen peroxide, while maintaining the temperature at 40° C. After 1.5 hours the temperature was raised to 48° C. for 1.0 hour and then to 55° C. for 2.0 hours at which time 8.12% of the original hydrogen peroxide remained. The cooled mixture was filtered and the filtrate caustic treated and washed with water. After removal of the benzene under vacuum the epoxidized soyabean oil product had an oxirane oxygen content of 6.26% and an iodine number of 1.4.

*Example 17*

To a stirred mixture of 1200 parts of soyabean oil having an iodine number of 130, 1200 parts of benzene and 816 parts of phthalic anhydride, heated to 40° C., was added dropwise over a 1.5 hours period, 306 parts of a 50% aqueous solution of hydrogen peroxide, while maintaining the temperature at 40° C. After an additional 5.5 hours, 2.4% of the original hydrogen peroxide remained. The product was cooled, filtered, washed with water, caustic treated, again washed with water, and the benzene removed under vacuum. The resulting epoxidized soyabean oil product had an iodine number of 36 and an oxirane oxygen content of 5.1%.

*Example 18*

To a stirred mixture of 1200 parts of soyabean oil having an iodine number of 130, 1200 parts of benzene and 1050 parts of phthalic anhydride, heated to 40° C., was added dropwise over a 2 hour period, 398 parts of a 50% aqueous solution of hydrogen peroxide, while maintaining the temperature at 40° C. After an additional 4.75 hours, 3.7% of the original hydrogen peroxide remained. After treatment in the usual manner the resulting epoxidized soyabean oil product had an oxirane oxygen content of 6.36% and an iodine number of 11.3.

*Example 19*

To a stirred mixture of 1200 parts of soyabean oil having an iodine number of 130, 1200 parts of benzene and 582 parts of phthalic anhydride, heated to 40° C., was added over a 1.25 hours period, 221 parts of a 50% aqueous solution of hydrogen peroxide, while maintaining the temperature at 40° C. After an additional 5.25 hours, 2.26% of the original hydrogen peroxide remained. After treatment in the usual manner the resulting epoxidized soyabean oil had an oxirane oxygen content of 3.8% and an iodine number of 62.3.

*Example 20*

To a stirred mixture of 300 parts of an ester prepared from tall oil and propylene glycol having an iodine number of 117, 300 parts of benzene and 259 parts of phthalic anhydride, heated to 55° C., was added dropwise over a 0.5 hour period, 94 parts of a 50% aqueous solution of hydrogen peroxide, while maintaining the temperature at 55° C. for an additional 0.5 hour. The temperature rose to 63° C. after an additional 0.5 hour then fell to 49° C. After a total reaction time of 4.3 hours, 5.44% of the original hydrogen peroxide remained. The mixture was cooled, filtered, washed with water, caustic treated, again washed with water, and the benzene removed under vacuum. The resulting epoxidized tall oil ester product had an oxirane oxygen content of 5.3% and an iodine number of 14.9. The theoretical oxirane oxygen content is 6.87%.

*Example 21*

A mixture was prepared of 300 parts of the β-polymer of diallyl phthalate in the form of a solid powder having an iodine number of 60, 500 parts of benzene and 595 parts of phthalic anhydride. The mixture was heated to 60° C. and to the mixture there was added over a one hour period, 52 parts of a 50% aqueous hydrogen peroxide solution. The resulting mixture was maintained at 60 °C. for an additional 1.5 hours, at which time only 4.9% of the original hydrogen peroxide remained. The mixture was then filtered to remove the solid phthalic acid. After washing the filter cake with 250 parts of benzene, the combined filtrates were washed four times with one liter portions of 50–60° C. water, then with dilute aqueous sodium hydroxide solution and finally with 3 one liter portions of water. The benzene was then removed by stripping leaving 300 parts of solid epoxidized diallyl phthalate beta polymer product which had an iodine number of 35 and analyzed 1.32 percent oxirane oxygen.

The resulting product is soluble in volatile solvents such as benzene, toluene, xylene, etc. When dissolved in such solvent, together with a curing agent, e.g., benzoyl peroxide, it can be applied as a coating in the usual ways, forming, after drying and curing, a tough, adhesive coating on substrates such as metals.

When the epoxidation is carried further to increased oxirane contents, smaller amounts of curing agents will be required.

The epoxidized products of our invention are useful for a variety of industrial applications.

The epoxidized soyabean oil products of our invention are useful as plasticizers for resinous materials, particularly for chlorine-containing polymeric compounds such as vinyl chloride polymers and co-polymers, chlorinated polyethylene, etc., and when used in such formulations, exhibit less tendency to bleed out than many epoxidized soyabean oils commercially available, and have better efficiency as evidenced by lower hardness, stiffness and modulus at 100% elongation, better low temperature properties, more resistance to light degradation, and better extraction resistance to soapy water than prior art epoxidized soyabean oils.

The epoxidized cycloalkenes are useful as crosslinking agents, as reactive monomers and for the preparation of condensation polymers with carboxylic acids.

The epoxidized esters, e.g., the epoxidized dialkyl tetrahydrophthalates, and epoxidized diallyl esters of dibasic acids are also useful as plasticizers, and are particularly useful in the preparation of epoxy resins as for example by reaction with other unsaturated compounds such as styrene, etc. The epoxidized polymeric compounds are useful in the manufacture of coating compositions.

While the above describes the preferred embodiments of our invention, it will be understood that departures may be made therefrom within the scope of the specification and claims.

We claim:

1. The process for producing compounds containing the oxirane group which comprises adding to an ethyleneically unsaturated compound containing at least one double bond of the non-conjugated ethylenic group in proportions at least about the stoichiometric equivalent of the double bonds to be epoxidized, a concentrated solution of hydrogen peroxide and a cyclic anhydride of an acid selected from the group consisting of aromatic and saturated aliphatic dicarboxylic acids wherein the oxygen-containing anhydride ring is a five membered ring containing four carbon atoms and one oxygen atom, at temperatures between about 20° C. and about 100° C. and maintaining said temperatures until approximately the theoretical amount of hydrogen peroxide has reacted.

2. The process according to claim 1 wherein the cyclic anhydride is phthalic anhydride.

3. The process according to claim 1 wherein the cyclic anhydride is succinic anhydride.

4. The process according to claim 1 wherein the ethylenically unsaturated compound is soyabean oil.

5. The process according to claim 1 wherein the ethylenically unsaturated compound is a diallyl ester of a dicarboxylic acid.

6. The process according to claim 1 wherein the ethylenically unsaturated compound is a Δ⁴ dialkyl tetrahydrophthalate.

7. The process according to claim 1 wherein the ethylenically unsaturated compound is a cycloalkene.

8. The process according to claim 1 wherein the ethylenically unsaturated compound is the beta polymer of diallyl phthalate having an iodine number between about 50 and about 80.

9. An epoxidized beta polymer of diallyl phthalate containing between about 0.6% and about 3.6% oxirane and having an iodine number between about 10 and about 65.

10. The process for producing compounds containing the oxirane group which comprises adding gradually and with agitation to a mixture of (1) an ethylenically unsaturated compound containing at least one isolated double bond and of the structure selected from the group consisting of

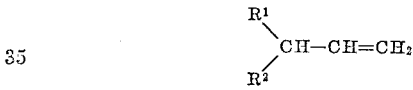

and

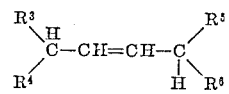

wherein $R^1$, $R^2$, $R^3$, $R^4$, $R^5$ and $R^6$ are selected from the group consisting of hydrogen and organic radicals containing only carbon, hydrogen and oxygen, and (2) a cyclic anhydride selected from the group consisting of phthalic anhydride and succinic anhydride, a concentrated aqueous solution of hydrogen peroxide in an amount sufficient to epoxidize at least some of the double bonds of the ethylenically unsaturated compound, while maintaining the temperature of the mixture between about 20° C. and about 100° C. during addition of the hydrogen peroxide and for a period thereafter sufficient to reduce the hydrogen peroxide content of the reaction mixture to not more than about 10% of that originally introduced.

11. The process according to claim 10 wherein the ethylenically unsaturated compound is an unsaturated oil and the cyclic anhydride is phthalic anhydride.

12. The process according to claim 10 wherein the ethylenically unsaturated compound is a diallyl ester of a dicarboxylic acid having from 2 to 8 carbon atoms.

References Cited in the file of this patent

UNITED STATES PATENTS

| | | |
|---|---|---|
| 2,377,038 | Reichert et al. | May 29, 1945 |
| 2,476,922 | Shokal et al. | July 19, 1949 |
| 2,813,896 | Krimm | Nov. 19, 1957 |
| 2,873,283 | Yang | Feb. 10, 1959 |
| 2,903,465 | Suter et al. | Sept. 8, 1959 |
| 2,997,484 | Beavers et al. | Aug. 22, 1961 |

UNITED STATES PATENT OFFICE
CERTIFICATE OF CORRECTION

Patent No. 3,155,638                 November 3, 1964

Max B. Mueller et al.

It is hereby certified that error appears in the above numbered patent requiring correction and that the said Letters Patent should read as corrected below.

Column 11, line 66, strike out "double bond of the".

Signed and sealed this 27th day of April 1965.

(SEAL)
Attest:

ERNEST W. SWIDER                         EDWARD J. BRENNER
Attesting Officer                           Commissioner of Patents